United States Patent
Moyer et al.

(10) Patent No.: US 7,831,862 B2
(45) Date of Patent: Nov. 9, 2010

(54) SELECTIVE TIMER CONTROL DURING SINGLE-STEP INSTRUCTION EXECUTION

(75) Inventors: William C. Moyer, Dripping Springs, TX (US); Jason T. Nearing, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 560 days.

(21) Appl. No.: 11/668,787

(22) Filed: Jan. 30, 2007

(65) Prior Publication Data

US 2008/0184056 A1    Jul. 31, 2008

(51) Int. Cl.
G06F 11/00    (2006.01)
(52) U.S. Cl. .......................... 714/30; 714/55
(58) Field of Classification Search .................. 714/25, 714/30, 37, 39, 51, 55
See application file for complete search history.

(56) References Cited

U.S. PATENT DOCUMENTS

| | | | |
|---|---|---|---|
| 4,090,239 A | 5/1978 | Twibell et al. | |
| 4,926,319 A * | 5/1990 | Wilkie et al. | 713/502 |
| 5,392,052 A | 2/1995 | Eberine | |
| 5,541,943 A * | 7/1996 | Niescier et al. | 714/815 |
| 5,568,649 A | 10/1996 | MacDonald et al. | |
| 5,740,451 A | 4/1998 | Muraki et al. | |
| 5,751,735 A * | 5/1998 | Tobin et al. | 714/733 |
| 5,812,830 A * | 9/1998 | Naaseh-Shahry et al. | 713/400 |
| 6,145,103 A * | 11/2000 | Typaldos et al. | 714/55 |
| 6,553,513 B1 | 4/2003 | Swoboda et al. | |
| 6,601,189 B1 | 7/2003 | Edwards et al. | |
| 6,658,555 B1 | 12/2003 | Kahle et al. | |
| 6,839,654 B2 | 1/2005 | Rollig et al. | |
| 6,986,026 B2 * | 1/2006 | Roth et al. | 712/227 |
| 7,073,097 B2 * | 7/2006 | Kuwayama | 714/51 |
| 7,159,144 B2 | 1/2007 | Babu et al. | |
| 7,162,410 B1 * | 1/2007 | Nemecek et al. | 703/28 |
| 7,334,161 B2 | 2/2008 | Williams et al. | |
| 2003/0126502 A1 | 7/2003 | Litt | |
| 2004/0260913 A1 | 12/2004 | Babu et al. | |
| 2006/0117224 A1 | 6/2006 | Wu | |
| 2007/0053301 A1 | 3/2007 | Maruoka et al. | |
| 2007/0198759 A1 | 8/2007 | Agarwal | |
| 2008/0184055 A1 | 7/2008 | Moyer et al. | |
| 2008/0184056 A1 | 7/2008 | Moyer et al. | |

(Continued)

FOREIGN PATENT DOCUMENTS

JP    06044086 A    2/1994

(Continued)

OTHER PUBLICATIONS

"MC68HC912D60A/D", Rev. 3.1, Freescale Semiconductor, Inc., Aug. 2005, pp. 74-77; 140; 168-174; 223-262; 379-403.

(Continued)

*Primary Examiner*—Dieu-Minh Le

(57) ABSTRACT

A processing device includes a timer and a processor core configured to execute an instruction during a debug session. The processing device further includes a timer control module configured to selectively enable/disable the timer based on a characteristic of the instruction. Another processing device includes a timer, a processor core configured to single step execute a sequence of instructions during a debug session, and a timer control module configured to selectively enable/disable the timer during single step execution of each instruction of the sequence of instructions.

15 Claims, 5 Drawing Sheets

U.S. PATENT DOCUMENTS

2008/0320290 A1   12/2008   Moyer

FOREIGN PATENT DOCUMENTS

| JP | 06131271 A | 5/1994 |
| JP | 10307737 A | 11/1997 |
| JP | 2002063072 A | 2/2002 |

OTHER PUBLICATIONS

U.S. Appl. No. 11/668,780, Office Action mailed May 4, 2009.
U.S. Appl. No. 11/765,891 Office Action mailed Sep. 30, 2009.
U.S. Appl. No. 11/765,891, Final Office Action mailed Mar. 4, 2010, 14 pages.
U.S. Appl. No. 11/668,780, Notice of Allowance mailed Nov. 13, 2009, 6 pages.
U.S. Appl. No. 11/668,780, Office Action mailed Apr. 5, 2010, 15 pages.
KIPO International Search Report mailed Oct. 28, 2010 for PCT/US08/64200, 2 pages.
Notice of Allowance mailed Aug. 10, 2010 for U.S. Appl. No. 11/668,780, 6 pages.
Notice of Allowance mailed Jul. 9, 2010 for U.S. Appl. No. 11/765,891, 6 pages.

* cited by examiner

SELECTIVE TIMER CONTROL DURING SINGLE-STEP INSTRUCTION EXECUTION

CROSS-REFERENCE TO RELATED APPLICATIONS

The present application is related to U.S. Ser. No. 11/668,780, entitled "Instruction-Based Timer Control During Debug," and filed on even date herewith, the entirety of which is incorporated by reference herein.

FIELD OF THE DISCLOSURE

The present disclosure relates generally to processing devices and more particularly to timer control in processing devices.

BACKGROUND

Processing devices, such as central processing units (CPUs), often implement one or more timers to control operations or to provide periodic stimuli during normal operations. However, when a processing device enters a debug mode, improper control of these timers can lead to error states in the operation of the processing device. In order to reduce the risk of improper operation, some processing devices implement a scheme whereby all timers are disabled by default while in a debug mode. While this scheme has the potential to reduce or eliminate certain undesirable timer-related operations, such as an unintended reset caused by a watchdog timer that was not timely refreshed, certain instructions being debugged may make use of other timers and thus the debugging of these instructions while all timers are disabled can result in an inaccurate debug analysis. Accordingly, an improved technique for controlling timers in a processing device would be advantageous.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
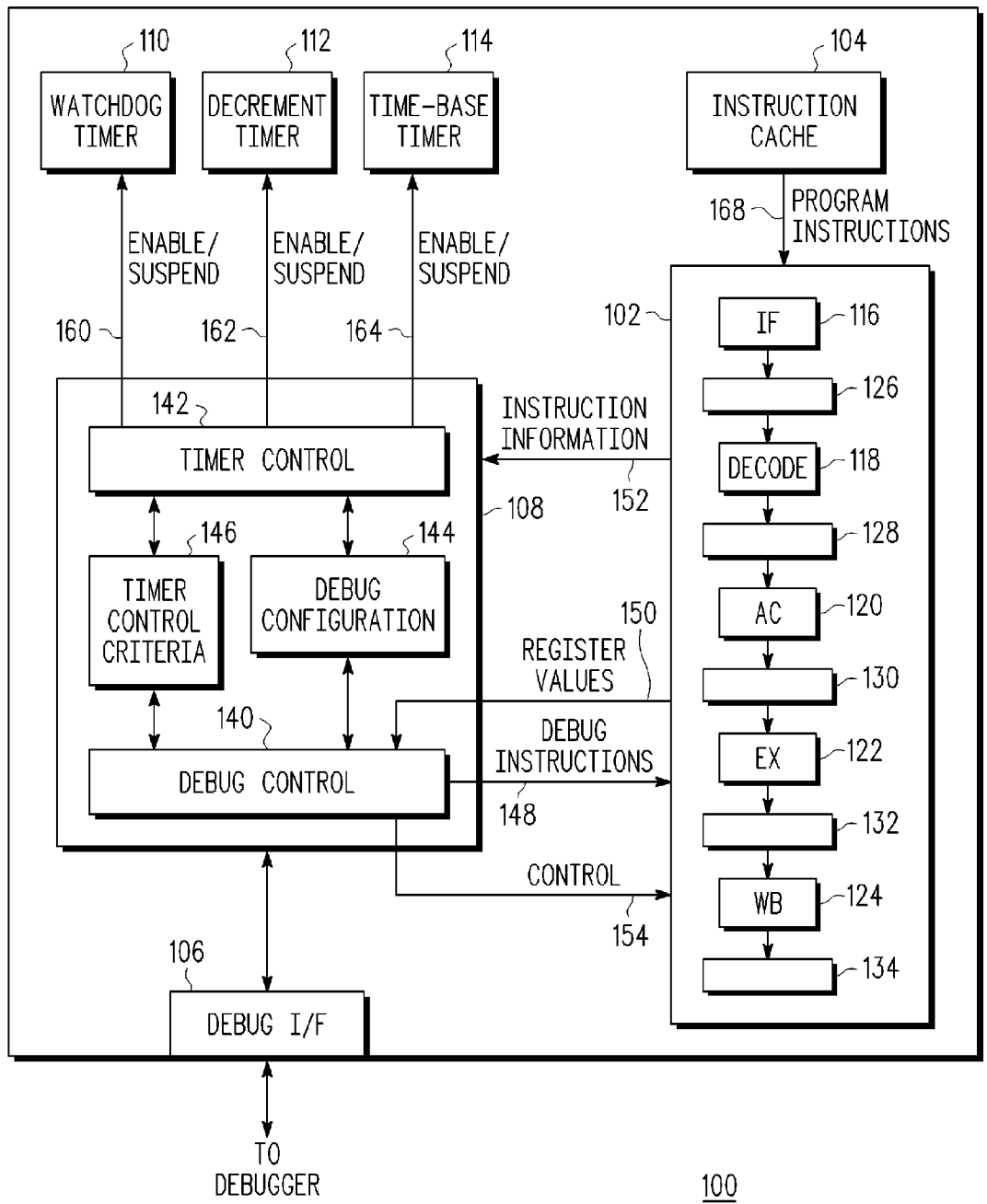
FIG. 1 is a block diagram illustrating a processing device using instruction-based timer control during a debug session in accordance with at least one embodiment of the present disclosure.

In accordance with one aspect of the present disclosure, a processing device includes a timer and a processor core configured to execute an instruction during a debug session. The processing device further includes a timer control module configured to selectively enable/disable the timer based on a characteristic of the instruction.

In accordance with another aspect of the present disclosure, a method includes receiving an instruction for execution at a processing device during a debug session and determining a characteristic of the instruction. The method further includes selectively enabling/disabling a timer of the processing device based on the characteristic.

In accordance with yet another aspect of the present disclosure, a method includes executing a set of program instructions at a processing device, and executing a set of one or more debug instructions at the processing device following an execution of each program instruction of the set of program instructions. The method further includes selectively enabling/disabling a first timer when the processing device during execution of each program instruction of the set of programming instructions based on a characteristic of the program instruction. The method additionally includes disabling the first timer when the processing device during execution of each debug instruction of the set of one or more debug instructions.

In accordance with another aspect of the present disclosure, a processing device includes a timer, a processor core configured to single step execute a sequence of instructions during a debug session, and a timer control module configured to selectively enable/disable the timer during single step execution of each instruction of the sequence of instructions.

In accordance with yet another aspect of the present disclosure, a method includes receiving an instruction for execution at a processing device during a debug session, performing a single step execution of the instruction during the debug session, and selectively enabling/disabling a timer of the processing device during the single step execution based on a control input.

In accordance with yet another embodiment of the present disclosure, a method includes single step executing a set of program instructions at a processing device and executing a set of one or more debug instructions at the processing device following an execution of each program instruction of the set of program instructions. The method further includes enabling a timer when the processing device is single step executing a program instruction of the set of program instructions and disabling the timer when the processing device is executing a debug instruction.

FIGS. 1-5 illustrate example techniques for controlling one or more timers of a processing device during a debug session on a per-instruction basis. In one embodiment, the processing device enters a debug mode and begins a debug session during which program instructions are executed by the processing device under control of debug control circuitry, and the state values resulting from execution of the program instructions are provided to an external debug device for analysis. For each instruction of at least a subset of the instructions to be executed during a debug session, the processing device can determine one or more characteristics of the instruction and, based on the one or more characteristics, selectively enable or disable (selectively enable/disable) one or more timers of the processing device for the execution of the instruction. The considered instruction characteristics can include, but are not limited to, the instruction type, e.g., the operation performed by the instruction (e.g., whether the instruction is a move instruction, a store instruction, an add instruction, etc.), the instruction source (e.g., whether the instruction is from the program of instructions being debugged or a debug instruction), an instruction address range, a source address range, a destination address range, a particular register, and the like. In another embodiment, a debug control field, such as in a debug control register, can be utilized by the debug control circuitry or an external debug device to selectively enable/disable some or all of the timers during the single-step execution of instructions during a debug session, thereby utilizing the debug control field as a default configuration for timer control during single-step execution without requiring timer configuration for each instruction. Further, in one embodiment, both the debug control fields and the instruction characteristics can be utilized to selectively enable/disable one or more timers during a debug session. After the debug session is complete, the processor can be released to perform normal (i.e., non-debug) instruction processing.

FIG. 1 illustrates a processing device 100 implementing a per-instruction timer control scheme during debug in accordance with at least one embodiment of the present disclosure. The processing device 100 includes a processing core 102, an instruction cache 104, an external debug interface 106, a debug module 108, and one or more timers, such as a watchdog timer 110, a decrement timer 112, and a time-base timer 114 (referred to herein collectively as "timers 110-114").

The processor core 102 includes an execution pipeline comprising, for example, an instruction fetch module 116, an instruction decode module 118, an address calculation module 120, an execution module 122, and a writeback module 124. The execution pipeline further can make use of temporary registers between stages of the execution pipeline, such as, for example, temporary registers 126, 128, 130, 132, and 134 (hereinafter, "temporary registers 126-134").

The external debug interface 106 can include any of a variety of standard or proprietary debug interface configurations used to interface with an external debug device. To illustrate, in one embodiment, the external debug interface 106 includes a test access port (TAP) substantially compliant with the Institute of Electrical and Electronic (IEEE) 1149.1 standard (also referenced as the Joint Test Action Group (JTAG) standard).

The watchdog timer 110, in one embodiment, includes a timer that is configured to initiate a system reset in the event that its timer value reaches a threshold value (e.g., zero). Accordingly, during normal operation, the processing device 100 is configured to periodically refresh timer value of the watchdog timer 110 so as to prevent it from reaching the threshold value. The decrement timer 112, in one embodiment, is configured to decrement a value until a threshold value is reached, at which time the decrement counter generates an interrupt request. The periodic interrupt requests generated by the decrement timer 112 can be used, for example, by an operating system as a "time tick." The time-base timer 114, in one embodiment, continually increments (or decrements) its timer value and typically serves as a representation of time for real-time-based applications.

The debug module 108 includes a debug control module 140, a timer control module 142, one or more debug configuration registers 144, and a timer control criteria datastore 146 (implemented as, for example, a register file). The debug control module 140 and the timer control module 142, in one embodiment, are implemented as logic circuits (e.g., state machines). The debug control module 140 includes an input to receive debug commands from an external debug device (not shown) via the external debug interface 106. Based on the debug commands, the debug control module 140 sends one or more debug instructions 148 to the processor core 102 for execution and receives one or more register values 150 or other state values of registers being monitored that result from the execution of the debug instructions 148 provided to the processor core 102 for execution. In one embodiment, the debug control module 140 uses one or more scan chains of the processor core 102 to scan in a debug instruction 148. The debug control module 140 further can use one or more scan chains of the processor core 102 to obtain the register values 150 either from a register file (not shown) associated with the processor core 102 or from one or more of the temporary registers 126-132. The obtained register values 150 then can be provided to the external debug device via the external debug interface 106.

The timer control module 142 includes an input to access the timer control criteria datastore 146 and the debug configuration registers 144, an input to obtain instruction information 152 identifying one or more characteristics of the instruction to be executed by the processing core 102, and outputs to provide enable/disable signals 160, 162, and 164 to the watchdog timer 110, the decrement timer 112, and the time-base timer 114, respectively. In one embodiment, for each program instruction to be executed at the processor core 102, the timer control module 142 accesses the timer control criteria information stored in the timer control criteria data store 146, compares the instruction information 152 with at least one criterion represented by the timer control criteria information to determine which timers are to be enabled and which timers are to be disabled for the execution of the instruction, and then assert or deassert each of the enable/disable signals 160, 162, and 164 accordingly so as to independently disable or enable the watchdog timer 110, the decrement timer 112, and the time-based timer 114. The enable/disable signals 160, 162, and 164 can enable or disable the corresponding timers 110-114 using clock gating, the removal or reduction of power to the timers 110-114, and the like.

In one embodiment, the timer control module 142 can use any of a variety of instruction characteristics for the purposes of enabling or disabling a timer. In one embodiment, the instruction information 152 can include the instruction type, whereby the instruction type identifies a particular operation to be performed by the instruction (such as a move operation, a store operation, an arithmetic operation, a floating point operation, etc.) and the timer control criteria information can include a criterion that identifies which of the timers are to be enabled, or disabled, for corresponding instruction types. In another embodiment, the instruction information 152 can include the instruction source (e.g., whether the instruction is a program instruction that is being debugged or a debug instruction used to set up the debug process) and the timer control criteria information can include a criterion that identifies which of the timers are to be enabled, or disabled, for corresponding instruction sources. In yet another embodiment, the instruction information 152 can include an instruction address, a source address, or a destination address, a privilege level of the instruction (or the application/OS associated with the instruction) and the timer control criteria information can identify which of the timers are to be enabled, or disabled, for a corresponding specified address or address range (e.g., an inclusive address range or an exclusive address range). Although a number of example instruction characteristics have been described, other instruction characteristics can be utilized to selectively enable/disable one or more timers without departing from the scope of the present disclosure.

In another embodiment, the timer control module 142 is configured to enable or disable the timers 110-114 based on control information of the debug configuration register 144 (which the timer control module 142 may itself set or which may be set by the external debugger through debug interface 106 and debug control 140) independently of any instruction characteristic. Thus, the debug configuration register 144 may provide individual timer control information based on the settings of one or more single-step control fields within the debug configuration register 144, such as the fields FTBSS, FDECSS, and FWDSS described in Table 1 below. In an alternate embodiment, individual timer control may be generated by combining the information contained within the debug configuration register 144 along with one or more instruction characteristics. An example format of some of the bits of the debug configuration register 144 are provided as Table 1.

TABLE 1

TIMER BITS OF DEBUG CONFIGURATION REGISTER

| Bit(s) | Name | Description |
|---|---|---|
| 0 | FTB | Freeze time-base<br>0 - Time-base timer 114 enabled during debug sessions<br>1 - Time-base timer 114 disabled during debug sessions |
| 1 | FTBSS | Freeze time-base except when single stepping<br>0 - Time-base timer 114 enabled during debug sessions<br>1 - Time-base timer 114 disabled during debug sessions except during a single-stepped execution of a program instruction |
| 2 | FDEC | Freeze decrement<br>0 - Decrement timer 112 enabled during debug sessions<br>1 - Decrement timer 112 disabled during debug sessions |
| 3 | FDECSS | Freeze decrement except when single stepping<br>0 - Decrement timer 112 enabled during debug sessions<br>1 - Decrement timer 112 disabled during debug sessions except during a single-stepped execution of a program instruction |
| 4 | FWD | Freeze watchdog<br>0 - Watchdog timer 110 enabled during debug sessions<br>1 - Watchdog timer 110 disabled during debug sessions |
| 5 | FWDSS | Freeze watchdog except when single stepping<br>0 - Watchdog timer 110 enabled during debug sessions<br>1 - Watchdog timer 110 disabled during debug sessions except during a single-stepped execution of a program instruction |

As Table 1 illustrates, the single-step timer control fields, e.g., FTBSS, FDECSS, and FWDSS, can be used to configure a default timer control for each of the corresponding timers when the processing core 102 performs a single-step execution of an instruction. Accordingly, by configuring these particular fields, external timer control, e.g., from an external debug device, is not necessary to configure the timer control during single-step execution of instructions on a per-instruction basis.

When a debug session is initiated at the processing core 102 (e.g., by setting a corresponding bit of the debug configuration register 144 via the external debug interface 106), the debug module 108 interacts with the processor core 102 so as to control execution of one or more program instructions and then obtain the register values and other state values, such as information from memory or other on-chip peripherals, resulting from the execution of the one or more program instructions. The debug module 108 then provides the state values to an external debug device for analysis so as to determine the state of the processor core 102 resulting from the program instruction execution. Between the execution of individual instructions or groups of instructions, the processing device 100 returns to the debug mode and awaits directives from the debug module 108. In at least one embodiment, the debug session is configured as a single-step debug session whereby a program instruction is provided to the processing core 102 for execution and the processing core 102 temporarily exits debug mode (but not the debug session) to execute the program instruction. During execution of the program instruction, each of the watchdog timer 110, the decrement timer 112, and the time-base timer 114 can be independently enabled or disabled based on the characteristics of the program instruction. In another embodiment, during execution of the program instruction, some or all of the watchdog timer 110, the decrement timer 112, and the time-base timer 114 can be independently enabled or disabled based on settings of one or more single-step control fields within debug configuration register 144, which may be set by the debug module 108 directly or by an external debug device via the debug interface 106. After completing execution of the program instruction, the processing core 102 then returns to the debug mode, at which point the debug control module 140 provides a series of one or more debug instructions to the processor core 102 for execution so as to obtain the register values and other state values after execution of the program instruction. To illustrate, to obtain the value stored in a register R1, the debug control module 140 can provide a MOV R1, R1 instruction as a debug instruction for execution so as to cause the processing core 102 to obtain the value stored at the register R1 and store it back at the register R1, during which time the debug control module 140 can obtain the register value from, for example, one of the temporary registers 126-132 as it is being processed. As with the execution of the program instruction, the timers 110-114 can be individually enabled or disabled during the execution of the debug instructions based on the characteristics of the debug instructions. After the state values have been obtained by the debug module 108 and provided to the external debug device via the external debug interface 106, the single-step debug process can be repeated for the next program instruction.

In one embodiment, debug instructions are supplied as normal instructions, and are loaded into the instruction register and executed in the same manner as any other instruction set architecture (ISA) instruction. In this manner, the debug module 108 may utilize any of the typical processor resources in performing debug operations. In one embodiment, program instructions executed during a debug session are supplied from normal instruction memory via conventional instruction fetch control logic via control signaling 154 of the debug control module 140. In an alternate embodiment, program instructions may be supplied via the debug module 108 instead of being fetched from normal program memory, and may be decoded and executed by the processor core 102 in a similar manner to normally fetched program instructions from instruction memory storage. In this manner, the debug control module 140 can determine whether a provided instruction is a debug instruction or a program instruction and operate accordingly. Debug instructions or program instructions may be provided to the debug control module 140 via the debug interface 106 by an external debug device, which further can indicate the type of instruction.

Figure 2:
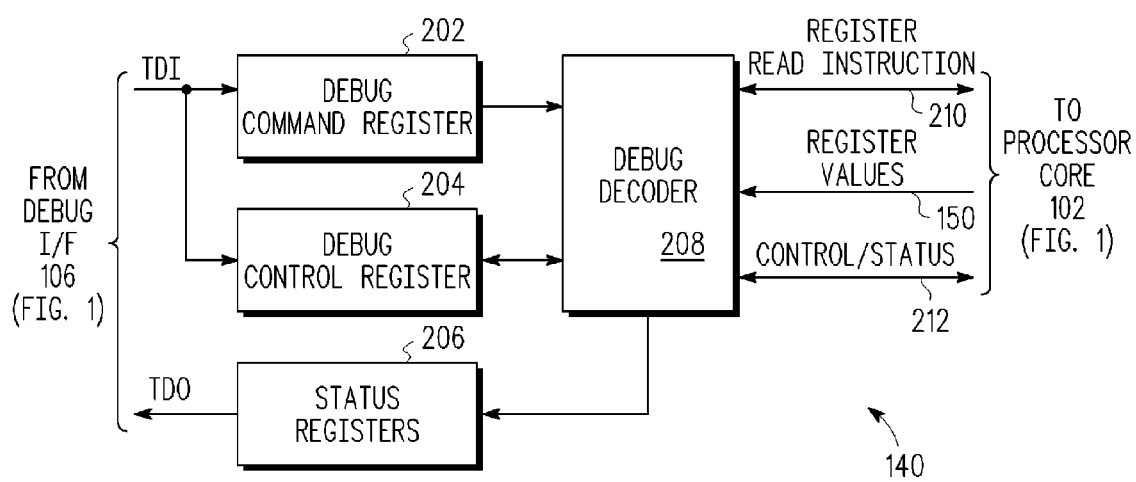
FIG. 2 is a block diagram illustrating a debug control module of the processing device of FIG. 1 in accordance with at least one embodiment of the present disclosure.

FIG. 2 illustrates an example implementation of the debug control module 140 of FIG. 1 in accordance with at least one embodiment of the present disclosure. In the depicted example, the debug control module 140 includes a debug command register 202 and a debug control register 204 accessible via the external debug interface 106 of FIG. 1 (e.g., via the test data in (TDI) input of a JTAG-compatible interface) and one or more status registers 206 accessible via the external debug interface 106 (e.g., via the test data out (TDO)

output of a JTAG-compatible interface). The debug control module 140 further includes a debug decoder 208 having access to the debug command register 202, the debug control register 204, and the status registers 206. The debug control module 140 includes an output to provide one or more register read instructions 210 (i.e., MOV Rn, Rn instructions, provided as debug instructions), an input to receive the register values 150 and an interface to provide and receive control/status information 212 for the processing core 102.

In operation, an external debug device shifts in a debug command to the debug command register 202 via the external debug interface 106, whereby the debug command directs the debug control module 140 to obtain one or more state values of the processor core 102. The external debug device further can shift in debug control information into the debug control register 204. Based on the debug command and the debug control information, the debug decoder 208 generates one or more register read instructions 210 and sequentially shifts each of the register read instructions 210 into the processor core 102 for execution. In one embodiment, each register read instruction 210 is a move instruction referencing the targeted register as both the source register and the destination register (e.g., MOV R1, R1 for register R1). During or after execution of the register read instruction 210, the corresponding register value 150 is obtained at the debug decoder 208, which then shifts the register value 150 into one of the status registers 206 for output to the external debug device via the external debug interface 106.

In one embodiment, the debug command register 202 is a N-bit shift register that receives its serial data from a TDI input of the external debug interface 106. An example format of the debug command stored in the debug command register 202 is provided as Table 2.

TABLE 2

DEBUG COMMAND FORMAT

| Bit(s) | Name | Description |
| --- | --- | --- |
| 0 | R/W | Specifies description of data transfer:<br>0 - Write the data associated with the command into the register specified by RS[0:6]<br>1 - Read the data contained in the register specified by RS[0:6] |
| 1 | GO | Go command bit:<br>0 - Inactive (no action taken)<br>1 - Execute the debug instruction<br>If the Go bit is set (1), the chip will execute the instruction which resides in the instruction register. To execute the instruction, the processor core 102 leaves the debug mode, executes the instruction, and if the EX bit is cleared, returns to the debug mode after executing the instruction. The processor core goes on to normal operation if the EX bit is set, and no other debug request source is asserted. |
| 2 | EX | Exit command bit:<br>0 - Remain in debug mode<br>1 - Leave debug mode<br>If the EX bit is set, the processor core 102 leaves the debug mode and resumes normal operation until another debug request is generated. |
| 3:9 | RS[0:6] | The register select bits identify which register is the source register for register read operations or which register is the destination register for register write operations. |

In one embodiment, additional instruction types may be supplied by the debug decoder 208 to the processor core 102 via the register read instructions 210 through the use of, for example, memory load or store instructions, various operational instructions (e.g., add, subtract, or multiply) and control the processor core 102 to execute the provided debug instruction via the control/status information 212, and to obtain results of the instruction execution via the registers 150 for provision to the external debug device.

Figure 3:
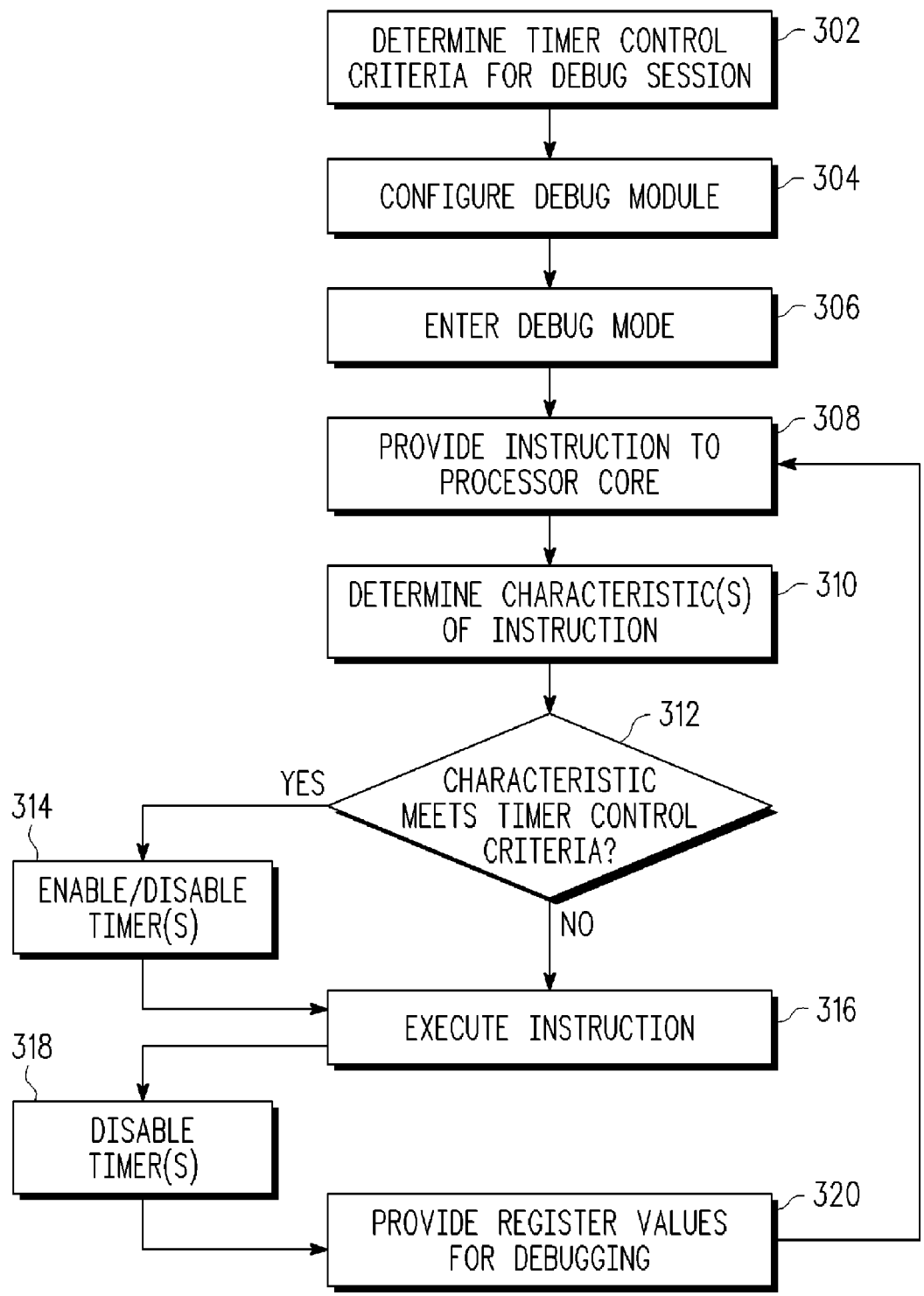
FIG. 3 is a flow diagram illustrating a method for instruction-based timer control during a debug session in accordance with at least one embodiment of the present disclosure.

FIG. 3 illustrates a method 300 for instruction-based timer control during a debug session in accordance with at least one embodiment of the present disclosure. For ease of discussion, the method 300 is described in the context of the processing device 100 of FIG. 1.

At block 302, the method 300 includes determining the desired timer control criteria for a debug session. The desired timer control criteria can be determined automatically based on characteristics of the program to be debugged, a human operator can determine the timer control criteria, and the like. The desired timer control criteria, in one embodiment, identifies which of the timers 110-114 is to be enabled, or alternately which of the timers 110-114 is to be disabled, during the execution of an instruction based on one or more characteristics of the instruction. The timer control criteria can include, for example, a particular instruction type, an instruction source, a particular instruction address or instruction address range, a destination address or destination address range, a source address or a source address range, and the like. Each of the timers 110-114 can have a separate control criteria. In an alternate embodiment, the timer control criteria may include one or more predetermined single-step control values stored within one or more debug control registers, such as the debug configuration register 144. Further, in one embodiment, the timer control criteria can be based on both instruction characteristics and single-step control values within a debug control register.

At block 304, the method 300 includes configuring the debug module 108 to include information representative of the timer control criteria determined at block 302. In one embodiment, data representing the timer control criteria (e.g., in table form) can be scanned into the timer control criteria datastore 146 via the external debug interface 106.

At block 306, the external debug device directs the processing device 100 to enter a debug mode and initiate the debug session. At block 308, the method 300 includes providing an instruction to the processor core 102 for execution. The instruction provided at block 308 can include a program instruction, or the instruction provided at block 308 can include a debug instruction to obtain state values resulting from the prior execution of a program instruction. At block 310, the processor core 102, or alternately the debug module 108, determines the applicable characteristics of the instruction provided at block 308. Depending on the relevant timer control criteria, the characteristics of the instruction can include, for example, the instruction type (e.g., the type of operation to be performed during execution of the instruction), the instruction source (e.g., an instruction from the program being debugged or an instruction from the debug module 108 for obtaining a state value), an instruction address, a source address, a destination address, and the like.

At block 312, the debug module 108 compares the one or more characteristics of the instruction with the corresponding timer control criteria. In the event that the characteristics meet a timer control criterion for enabling one of the timers 110-114, at block 314 the debug module 108 selectively enables (or, alternately, disables) one or more of the timers based on the met or unmet timer control criterion. To illustrate, assume that the timer control criteria includes an instruction address range for the watchdog timer 110 whereby the watchdog timer 110 is to be enabled during the execution of any instruction having an instruction address within the instruction address range. Accordingly, if the instruction provided at block 308 has an instruction address within the indicated range, the debug module 108 enables the watchdog timer 114 at block 314 for the execution of the instruction. As another example, assume that the timer control criteria includes an instruction source criteria for the time-base timer 110 whereby the time-base timer 114 is to be enabled (or alternately disabled) during the execution of an instruction from the program being debugged. Accordingly, if the instruction provided at block 308 is from the program being debugged, the debug module 108 enables (or, alternately, disables) the time-base timer 114 at block 314 for the execution of the instruction. The process represented by blocks 312 and 314 can be repeated for each indicated timer control criterion for each of the timers 110-114.

At block 316, the processor core 102 temporarily exits the debug mode and executes the instruction provided at block 308, whereby none, some, or all of the timers 110-114 may be selectively enabled/disabled during the instruction execution. After executing the instruction, at block 318 the processor core 102 returns to the debug mode and any enabled timers are disabled (or alternatively, enabled) in preparation for the analysis and execution of the next instruction at block 308. In the event that the executed instruction is a debug instruction, at block 320, any state values (e.g., register values, computation results, memory location values, etc.) obtained as a result of the execution may be provided to the external debug device via the external debug interface 106. The process of blocks 308, 310, 312, 314, 316, 318, and 320 can be repeated for each instruction (either program instruction or debug instruction) provided for execution during the debug session.

Figure 4:
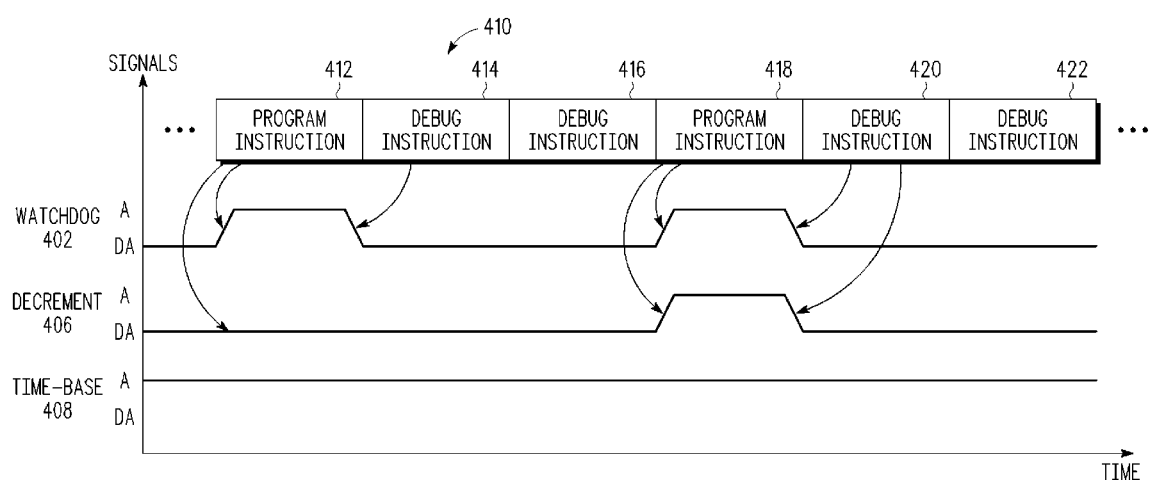
FIG. 4 is a timing diagram illustrating an example timer control operation during a debug session in accordance with at least one embodiment of the present disclosure.

FIG. 4 illustrates an example timing diagram 400 for a sequence of instructions executed during a debug session in accordance with at least one embodiment of the present disclosure. The timing diagram 400 is described in the context of the processing device 100 of FIG. 1 for ease of discussion. The signal 402 corresponds to the enable/disable signal 160 for the watchdog timer 110, the signal 406 corresponds to the enable/disable signal 162 for the decrement timer 112, and the signal 408 corresponds to the enable/disable signal 164 for the time-base timer 114. For the purposes of the timing diagram 400, it is assumed that a timer is enabled when its corresponding enable/disable signal is asserted ("A") and disabled when its corresponding enable/disable signal is deasserted ("DA").

In the depicted example, a sequence 410 of instructions is provided to the processor core 102 for execution. The sequence 410 initiates with a program instruction 412 followed by debug instructions 414 and 416, which are followed by a program instruction 418 followed by debug instructions 420 and 422 (which in this example are the same debug instructions as debug instructions 414 and 416, respectively).

In this example, assume that the timer control criteria for the watchdog timer 110 is instruction-source based such that the watchdog timer 110 is to be enabled for the execution of program instructions and disabled for the execution of debug instructions. Accordingly, the debug module 108 determines the instruction source each instruction in the sequence 410 as it is provided for execution and configures the signal 402 so that it is asserted during the execution of the program instructions 412 and deasserted during the execution of the debug instructions 414, 416, 420, and 422.

Also in this example, assume that the timer control criteria for the decrement timer 112 is instruction-address based such that the decrement timer 112 is to be enabled during the execution of an instruction having an instruction address in a predetermined instruction address range and disabled for all other instructions during the debug session. Further assume that only the program instruction 418 of the sequence 410 has an instruction address that falls within the predetermined range. Accordingly, as each instruction of the sequence 410 is provided for execution, the debug module 108 determines the instruction address of the instruction and accordingly enables the signal 406 during the execution of the program instruction 418 and disables the signal 406 during the execution of the program instruction 412, the debug instruction 414, the debug instruction 416, the debug instruction 420, and the debug instruction 422.

Moreover, assume in this example that the timer control criteria for the time-base timer 114 is such that the time-base timer 114 is to be enabled during the entire debug session regardless of the characteristics of the instructions being executed. Accordingly, the debug module 108 enables the signal 408 during the execution of the sequence 410 of instructions.

Figure 5:
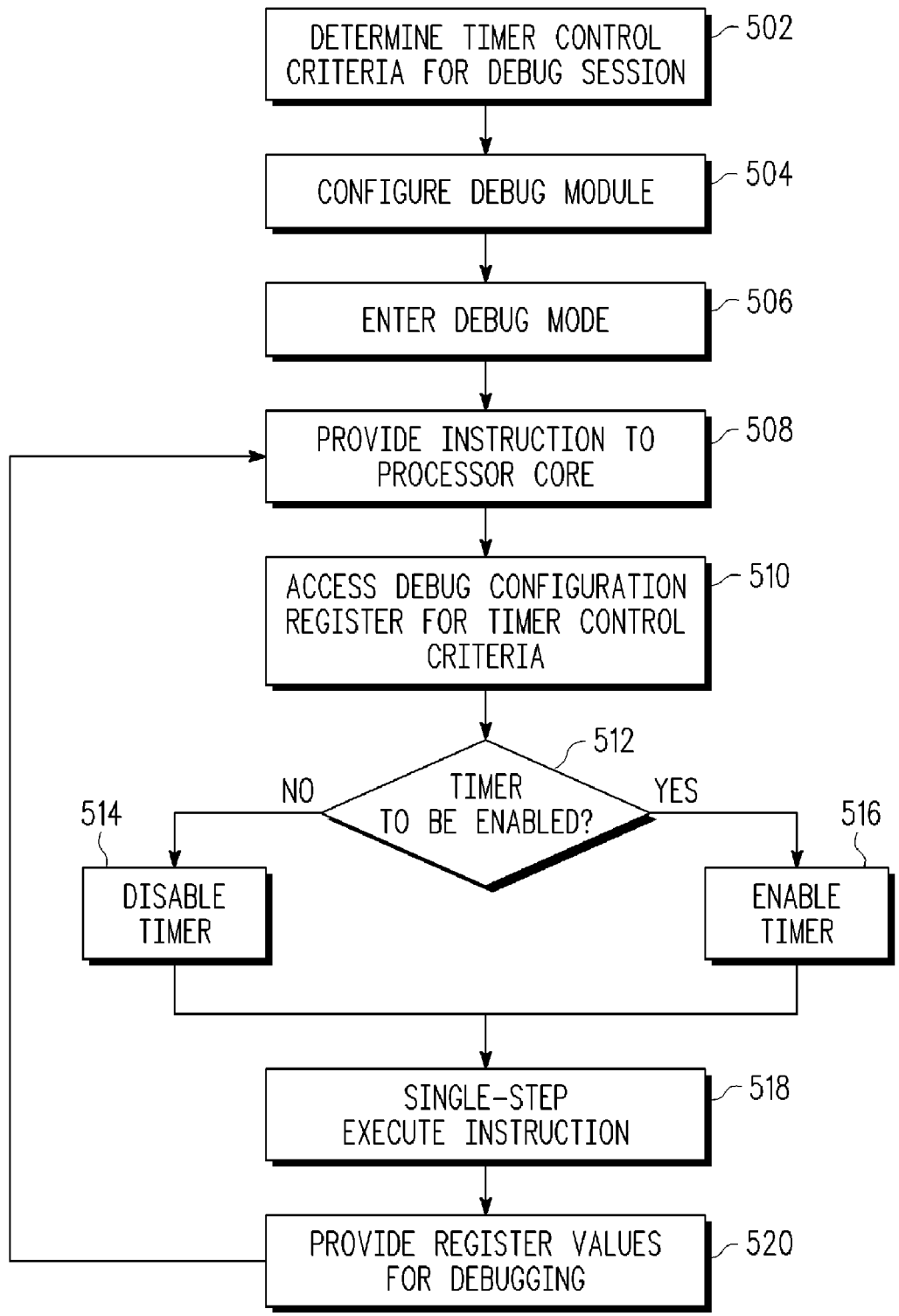
FIG. 5 is a flow diagram illustrating a method for time control for single-step instruction execution during a debug session in accordance with at least one embodiment of the present disclosure.

FIG. 5 illustrates a method 500 for selective timer control for single-step execution of instructions during a debug session in accordance with at least one embodiment of the present disclosure. For ease of discussion, the method 500 is described in the context of the processing device 100 of FIG. 1.

At block 502, the method 500 includes determining the initial timer control criteria for a debug session. The initial timer control criteria, in one embodiment, identifies which of the timers 110-114 is to be enabled, or alternately which of the timers 110-114 is to be disabled, during the single-step execution. The timer control criteria can include one or more predetermined single-step control values stored within one or more debug control registers, such as the configuration illustrated by Table 1.

At block 504, the method 500 includes configuring the debug module 108 to include information representative of the timer control criteria determined at block 302. In one embodiment, data representing the timer control criteria (e.g., in table form) can be scanned into the timer control criteria datastore 146 via the external debug interface 106.

At block 506, the external debug device directs the processing device 100 to enter a debug mode and initiate the debug session. At block 508, the method 500 includes providing an instruction to the processor core 102 for execution. The instruction provided at block 508 can include a program instruction, or the instruction provided at block 508 can include a debug instruction to obtain state values resulting from the prior execution of a program instruction.

At block 510, the timer control module 142 determines which of the timers 110-114 is to be enabled or disabled for the single-step execution of the instruction provided at block 508. As discussed above, in one embodiment, the debug module 108 includes a debug control register 144 that includes single-step timer control fields (e.g., the FTBSS, TDECSS, and the FWDSS fields of Table 1), which can be dynamically updated by an external debug device via the debug interface 106 at various points during the debug session. Accordingly, the timer control module 142 can determine whether a particular timer is to be selectively enabled/disabled by accessing the single-step timer control field of the debug control register 144 at block 510.

At block 512, the timer control module 142 ascertains the value of the single-step timer control field of the debug control register 144 to determine whether to enable the associated timer. If the single-step timer control field includes a value indicating the timer is to be disabled (e.g., a "0" bit value), at block 512 the timer control module 142 disables the associated timer until the conclusion of the single-step execution of the instruction obtained at block 508. Otherwise, if the single-step timer control field includes a value indicating the timer is to be enabled (e.g., a "1" bit value), at block 514 the timer control module 142 enables the associated timer until the conclusion of the single-step execution of the instruction. The process represented by blocks 512, 514, and 416 can be repeated for each of the timers 110-114.

In at least one embodiment, the debug module 108 can utilize both the debug control register 144 and the instruction characteristics to selectively enable/disable one or more of the timers 110-114. To illustrate, in one embodiment, the debug module 108 can be configured so that a timer is enabled during single-step execution of an instruction only when its corresponding single-step control field indicates that the timer can be enabled during single-step execution and when characteristic or characteristics of the instruction meet one or more identified criterion. Otherwise, if one or both of these requirements are not met, the debug module 108 maintains the timer in a disabled state.

At block 516, the processor core 102 temporarily exits the debug mode and single-step executes the instruction provided at block 508, whereby none, some, or all of the timers 110-114 may be selectively enabled/disabled during the single-step execution. After the single-step execution of the instruction, at block 518 the processor core 102 returns to the debug mode and any enabled timers are disabled (or alternatively, enabled) in preparation for the analysis and execution of the next instruction at block 508. In the event that the executed instruction is a debug instruction, at block 520, any state values obtained as a result of the execution may be provided to the external debug device via the external debug interface 106. The process of blocks 508, 510, 512, 514, 516, 518, and 520 can be repeated for each instruction (either program instruction or debug instruction) provided for single-step execution during the debug session.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A processing device comprising:
   a first timer;
   a processor core configured to single step execute a sequence of instructions during a debug session;
   an external debug interface;
   a debug control register accessible via the external debug interface; and
   a timer control module configured to selectively enable/disable the first timer during single step execution of each instruction of the sequence of instructions based on a first field of the debug control register, the first field identifying whether the first timer is to be enabled during a single step execution mode of the processor core.

2. The processing device of claim 1, wherein the first timer is selected from a group consisting of: a watchdog timer; a decrement timer; and a time-base timer.

3. The processing device of claim 1, further comprising:
   a second timer; and
   wherein the timer control module is configured to selectively enable/disable the second timer during single step execution of each instruction of the sequence of instructions.

4. The processing device of claim 3,
   wherein the timer control module further is configured to selectively enable/disable the second timer based on a second field of the debug control register, the second field identifying whether the second timer is to be enabled during the single step execution mode of the processor core.

5. The processing device of claim 1, wherein the timer control module further is configured to selectively enable/disable the first timer during single step execution of an instruction of the sequence of instructions based on a characteristic of the instruction.

6. The processing device of claim 5, wherein the timer control module is configured to selectively enable/disable the first timer in response to a comparison of the characteristic to a criterion.

7. The processing device of claim 5, wherein the characteristic is selected from a group consisting of: an instruction address; an instruction address range; an instruction type; a privilege level; and an instruction source.

8. A method comprising:
   receiving an instruction for execution at a processing device during a debug session;
   performing a single step execution of the instruction during the debug session;

selectively enabling/disabling a first timer of the processing device during the single step execution based on a first control input, wherein the first control input comprises a first field of a debug control register; and configuring the first field of the debug control register to have one of a first value or a second value in preparation for the single step execution of the instruction, the first value indicating that the first timer is to be enabled and the second value indicating that the first timer is to be disabled.

9. The method of claim 8, wherein configuring the first field of the debug control register comprises:

configuring the first field via an external debug interface of the processing device.

10. The method of claim 8, wherein selectively enabling/disabling the first timer comprises:

determining a value stored at the first field of the debug control register;

selectively enabling/disabling the first timer prior to the single-step execution of the instruction based on the value stored at the first field.

11. The method of claim 8, further comprising:

disabling the first timer in response to concluding the single step execution of the instruction.

12. The method of claim 8, further comprising:

selectively enabling/disabling a second timer of the processing device during the single step execution based on a second control input.

13. The method of claim 8, wherein t the second control input comprises a second field of the debug control register.

14. The method of claim 8, wherein selectively enabling/disabling the first timer comprises selectively enabling/disabling the first timer further based on a characteristic of the instruction.

15. The method of claim 14, wherein the characteristic is selected from a group consisting of: an instruction address; an instruction address range; an instruction type; a privilege level; and an instruction source.

* * * * *

UNITED STATES PATENT AND TRADEMARK OFFICE
CERTIFICATE OF CORRECTION

| | | |
|---|---|---|
| PATENT NO. | : 7,831,862 B2 | Page 1 of 1 |
| APPLICATION NO. | : 11/668787 | |
| DATED | : November 9, 2010 | |
| INVENTOR(S) | : William C. Moyer et al. | |

It is certified that error appears in the above-identified patent and that said Letters Patent is hereby corrected as shown below:

At column 14, line 9, please change "t the" to --a--

Signed and Sealed this
Sixteenth Day of August, 2011

David J. Kappos
*Director of the United States Patent and Trademark Office*